United States Patent
Vinding et al.

(10) Patent No.: US 12,212,931 B2
(45) Date of Patent: Jan. 28, 2025

(54) HEARING AID WITH TRANSMISSION POWER ADAPTATION

(71) Applicant: Oticon A/S, Smørum (DK)

(72) Inventors: Morten Vinding, Smørum (DK); Henrik Damborg Hald, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 18/460,133

(22) Filed: Sep. 1, 2023

(65) Prior Publication Data

US 2023/0412991 A1 Dec. 21, 2023

Related U.S. Application Data

(63) Continuation of application No. 17/548,275, filed on Dec. 10, 2021, now Pat. No. 11,785,398.

(30) Foreign Application Priority Data

Dec. 11, 2020 (EP) .................................... 20213508

(51) Int. Cl.
*H04R 25/00* (2006.01)

(52) U.S. Cl.
CPC ......... *H04R 25/552* (2013.01); *H04R 25/505* (2013.01); *H04R 25/558* (2013.01); *H04R 2225/31* (2013.01)

(58) Field of Classification Search
CPC .. H04R 25/552; H04R 25/505; H04R 25/559; H04R 2225/31
See application file for complete search history.

(56) References Cited

U.S. PATENT DOCUMENTS

| | | |
|---|---|---|
| 2002/0071482 A1 | 6/2002 | Peters et al. |
| 2010/0184383 A1 | 7/2010 | Lerke |
| 2012/0232616 A1 | 9/2012 | Van Baelen et al. |
| 2014/0349573 A1 | 11/2014 | Moes et al. |
| 2020/0178005 A1 | 6/2020 | Longaa |
| 2022/0303770 A1 | 9/2022 | Vendelbo |
| 2022/0323755 A1 | 10/2022 | Meskens et al. |
| 2022/0360913 A1 | 11/2022 | Stapf et al. |

FOREIGN PATENT DOCUMENTS

| | | |
|---|---|---|
| EP | 3 122 071 A1 | 1/2017 |
| WO | WO 2013/103943 A1 | 7/2013 |

OTHER PUBLICATIONS

"Spectral splatter", XP055801747, Retrieved from the Internet: URL:https://web.archive.org/web/20170416183036/https://en.wikipedia.org/wiki/Spectral_splatter [retrieved on May 5, 2021], Apr. 16, 2017, p. 1 of 1.
Extended European search report issued in Application No. 20213508.3 dated May 18, 2021.
European Communication pursuant to Article 94(3) EPC for European Application No. 21 213 230.2, dated Apr. 23, 2024.

*Primary Examiner* — Suhan Ni
(74) *Attorney, Agent, or Firm* — Birch, Stewart, Kolasch & Birch, LLP

(57) ABSTRACT

The present disclosure relates to a hearing aid having at least two wireless interfaces, where the operation of one wireless risk introducing noise into the at least second wireless interface. The first wireless interface being configured so that it does not, or at least to a limited degree, introduce noise into the second wireless interface.

15 Claims, 2 Drawing Sheets

HEARING AID WITH TRANSMISSION POWER ADAPTATION

This application is a Continuation of copending application Ser. No. 17/548,275, filed on Dec. 10, 2021, which claims priority under 35 U.S.C. § 119(a) to Application No. 20213508.3, filed in Europe on Dec. 11, 2020, all of which are hereby expressly incorporated by reference into the present application.

FIELD

The present disclosure relates to hearing aids having wireless configured to communicate wirelessly. More particularly, the disclosure relates to a hearing aid having an adaptable transmission power for wireless communication. The teaching of the present disclosure is equally applicable to other types of hearing devices, e.g. earbuds and hearables, configured in a housing to be positioned at an ear and/or ear canal of a user.

BACKGROUND

A hearing aid is a relatively small device, where internal components are positioned closely together. When having a hearing aid with a wireless interface and a cooperating antenna, e.g. an RF radio and an RF antenna, the wireless interface will be configured to operate according to some sort of protocol. The transmission of data from the hearing aid via the wireless interface could lead to generation of electromagnetic noise, i.e. signals outside the intended transmission signal. If the noise propagates into other components of the hearing aid, there is a need to mitigate this noise.

Therefore, there is a need to provide a solution that addresses at least some of the above-mentioned problems, and at least there is a need to provide an alternative to the prior art.

SUMMARY

The present disclosure relates generally to a hearing aid, or a hearing device, having at least two wireless interfaces, where the operation of one wireless risk introducing noise into the at least second wireless interface. The first wireless interface being configured so that it does not, or at least to a limited degree, introduce noise into the second wireless interface.

The preset disclosure relates to a hearing aid having a first wireless interface communicating via a first antenna element, the first wireless interface configured to operate at a first operational frequency. The hearing aid may comprise a second wireless interface configured to communicate via a first coil. The hearing aid may comprise a power source configured to provide power to components of the hearing aid. The hearing aid may be configured to charge a transmitter part of the first wireless interface according to a charge profile. By the wording charging a transmitter part of a wireless interface is in the present context taken to mean providing a charge to a charge storage of a transmitter from which the transmitter then is able to draw current during a transmission event. This could, as will be elucidated later, involve charging a capacitor, or several, or the like energy storing component or components. Also, a wireless interface may comprise both a transmitter part and a receiver part, where the transmitter part may have a need for higher power/charge levels faster than the receiver part, and thus, is has been found advantageous to provide an energy storage which may then be charged prior to a transmission event, such as between transmission events. This could be or include a situation where a high power level is to be used for a particular transmission event or series of transmission events.

The combination of time needed to provide charge to the energy storage component and the energy level to be achieved may be defined in a charge profile, e.g. 1 mA in 1 microsecond could be part of such a charge profile. The charge profile may define a relation between charged power level and time, wherein the charge profile defines a first inclination. The first inclination may thus be viewed as a (first) rate with a unit of mA/microsecond or dBm/microsecond. The inclination could be seen as a power-on ramp up speed when charging the power storage in the transmitter/wireless interface. When charging the transmitter for transmission according to the charge profile, there is little to non-electromagnetic disturbance into the first coil.

Advantageously, the first charge profile may configure the charging to be performed at a rate so that the voltage across a capacitor supplying the transmitter to be charged from 0.8 mA to 10 mA in 3 microseconds, such as from −28 dBm to +6.5 dBm in about 2 microseconds.

Advantageously, the hearing aid according to the present description may include the first wireless interface comprising an amplifier configured to be charged according to the charge profile. The amplifier, which may be a power amplifier, is configured to provide the power to be supplied to the antenna during transmission.

Advantageously, the hearing aid according to the present description may include the second wireless interface being configured to communicate inductively in a frequency range of about 1-900 MHz, such as around 4 MHz, such as around 5 MHz, such as around 900 MHz. One advantage of using inductive communication is that communication between two devices placed at respective left-right sides of the head of a wearer is at least that this type of communication is less subjected to loss when transmitting near the head of the wearer.

Advantageously, the hearing aid according to the present description may include that the transmitter being configured to transmit at a plurality of discrete power levels. By providing a number of power levels, the transmitter, or a controller controlling the operation, may select a power level that the transmitter is charged to for transmission. The power level may be chosen based on the desired data transmission rate. It could be contemplated that transmission (streaming) of speech picked up by an input transducer of the hearing aid is transmitted to a mobile phone during a telephone transmission may require a higher data rate than transmission of control data to/from the hearing aid e.g. to/from a mobile phone having an app to control the hearing and and/or for displaying status information relating to the hearing aid.

Advantageously, the hearing aid according to the present description may include that the plurality of power levels is 12, and wherein the highest power level is useful for two-way audio communication.

Advantageously, the hearing aid according to the present description may include that the first wireless interface is configured to communicate using Bluetooth and/or Bluetooth Low Energy protocol. This could help provide a data interface to a number of compatible devices, such as mobile phones, tablets, computers, etc.

Advantageously, the hearing aid according to the present description may include the second wireless interface is configured to communicate inductively to an external device, such as a contralaterally placed hearing aid, for transmitting audio signals from the hearing aid to the contralaterally placed hearing aid for supplying binaural sounds to the user.

Advantageously, the hearing aid according to the present description may include being configured to receive digitized sound via the first wireless interface and the hearing aid may then be further configured to (re)transmit the received digitized sound, or a processed version hereof, to the contralaterally placed hearing aid. This could be useful if one of the hearing aids in a binaural hearing aid system does not receive the signal from a third device, e.g. a phone, at a sufficiently high quality (e.g. a sufficient signal strength) for a certain purpose, e.g. voice transmission/reception. Having the one hearing aid retransmitting the signal to the other hearing aid would then allow for a received audio signal to be presented to each ear of the user (about) simultaneously.

An aspect of the present description relates to a system comprising a hearing aid according the present description and a mobile phone, where the hearing aid is configured to communicate with the mobile phone for transmission of speech to and from the mobile phone during a call.

A further aspect of the present description relates to binaural hearing aid system comprising two hearing aids according to the present description, each being configured to operate in a binaural mode.

A still further aspect of the present description relates to a system comprising a binaural hearing aid and a mobile phone, where at least one of the hearing aids of the binaural hearing aid is configured to communicate with the mobile phone for transmission of speech to and from the mobile phone during a call.

Other aspects and features of the present description will be elucidated in the below description. It is noted that the features of the aspects presented herein may be combined.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
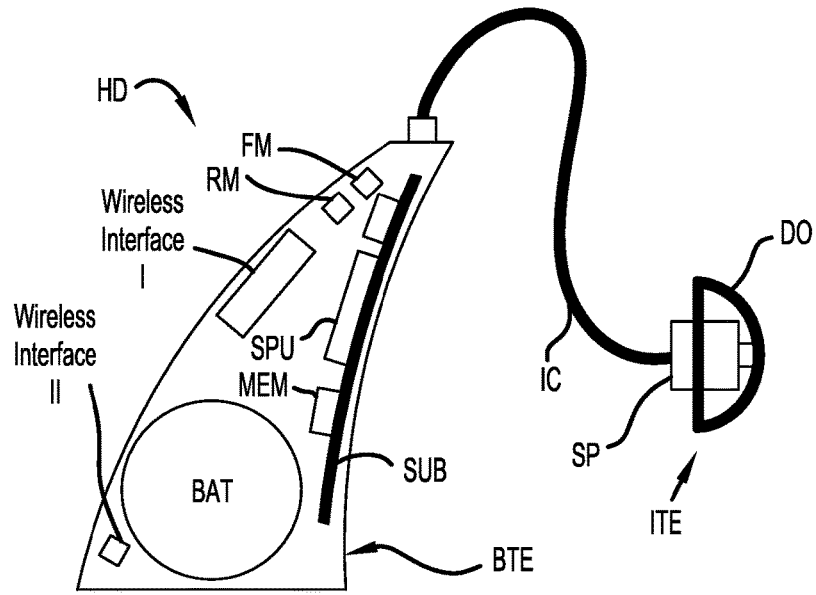
FIG. 1 schematically illustrates a hearing aid.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing aid, or hearing device, may by configured to communicate using a protocol, such as a data protocol. Such a data protocol may be proprietary, i.e. not all details of the protocol are known to the public as such, however, parts thereof may be. A data protocol may be publicly available, such as Bluetooth, Bluetooth Low Energy, Zigbee, WiFi or other such protocols. The protocol may be communicated over radiofrequency communication channel, such as via an antenna included in the housing of the hearing aid, or at least attached to the housing of the hearing aid, or in other forms communicating with a wireless interface in the hearing aid. The protocol may be used for transmitting sound, such as speech, encoded as data in to or out of the hearing aid, to/from an external device. The radiofrequency antenna may advantageously be configured to operate in the ISM band, such as in a frequency band in the range of 1 to 10 GHz, such as around 2.4 GHz and/or around 5 GHz.

In the present context, a hearing device (or hearing instrument, hearing assistance device) may be a hearing aid. A hearing aid may be adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. 'Improving or augmenting the hearing capability of a user' may include compensating for an individual user's specific hearing loss. The "hearing device" may further refer to a device such as a hearable, an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of the middle ear of the user or electric signals transferred directly or indirectly to the cochlear nerve and/or to the auditory cortex of the user.

The hearing device is adapted to be worn in any known way. This may include i) arranging a unit of the hearing device behind the ear with a tube leading air-borne acoustic signals into the ear canal or with a receiver/loudspeaker arranged close to or in the ear canal and connected by conductive wires (or wirelessly) to the unit behind the ear, such as in a Behind-the-Ear type hearing aid, and/or ii) arranging the hearing device entirely or partly in the pinna and/or in the ear canal of the user such as in an In-the-Ear type hearing aid or In-the-Canal/Completely-in-Canal type hearing aid, or iii) arranging a unit of the hearing device attached to a fixture implanted into the skull bone such as in a Bone Anchored Hearing Aid or a Cochlear Implant, or iv) arranging a unit of the hearing device as an entirely or partly implanted unit such as in a Bone Anchored Hearing Aid or a Cochlear Implant. The hearing device may be implemented in one single unit (housing) or in a number of units individually connected to each other.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include one or more auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of a remote control, a remote microphone, an audio gateway device, a wireless communication device, e.g. a mobile phone (such as a smartphone) or a tablet or another device, e.g. comprising a graphical interface, a public-address system, a car audio system or a music player, or a combination thereof. The audio gateway may be adapted to receive a multitude of audio signals such as from an entertainment device like a TV or a music player, a telephone apparatus like a mobile telephone or a computer, e.g. a PC. The auxiliary device may further be adapted to (e.g. allow a user to) select and/or combine an appropriate one of the received audio signals (or combination of signals) for transmission to the at least one hearing device. The remote control is adapted to control functionality and/or operation of the at least one hearing device. The function of the remote control may be implemented in a smartphone or other (e.g. portable) electronic device, the smartphone/electronic device possibly running an application (APP) that controls functionality of the at least one hearing device.

In general, a hearing device, and in particular a hearing aid, includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to (relatively) enhance a target acoustic source among a multitude of acoustic sources in the user's environment and/or to attenuate other sources (e.g. noise). In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

Figure 3:
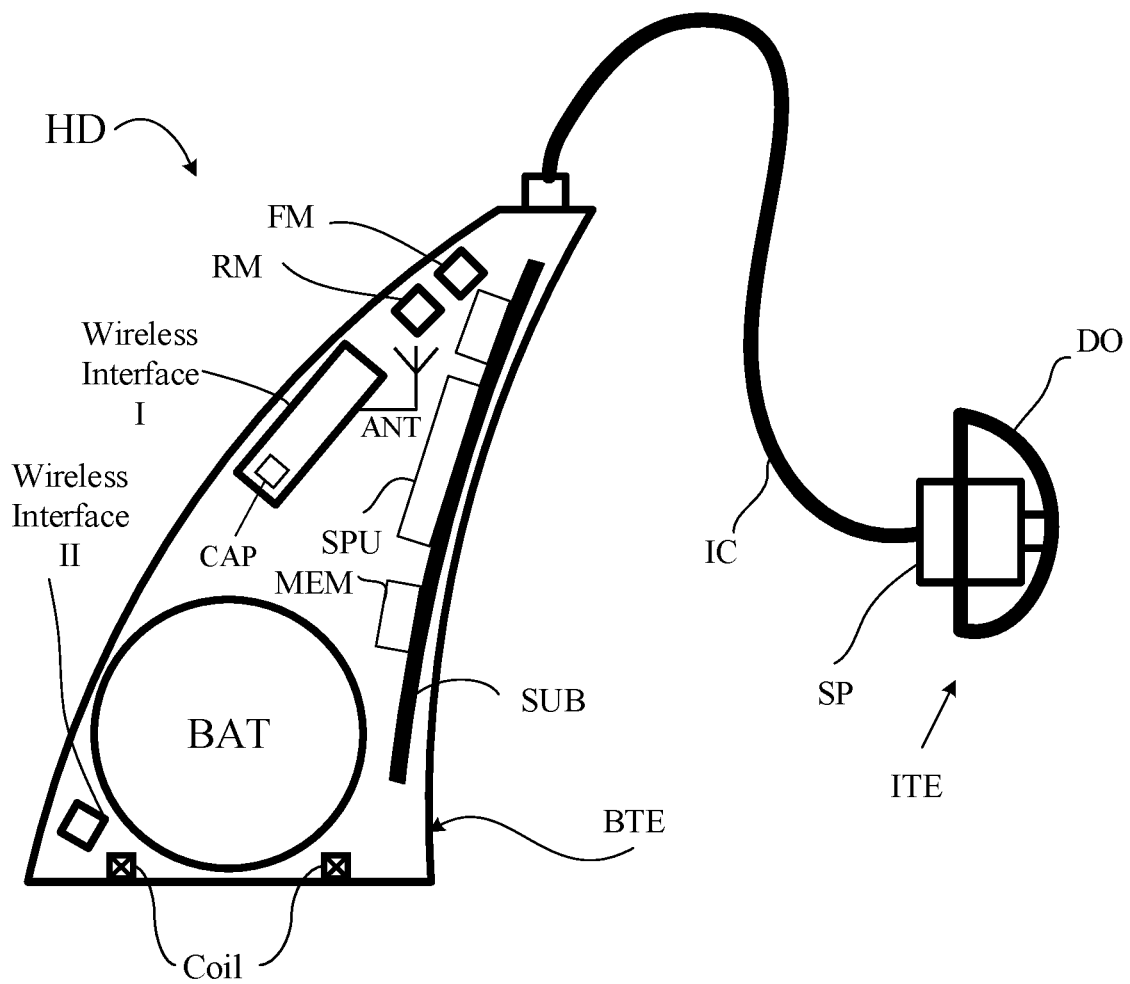
FIG. 3 schematically illustrates the hearing aid of FIG. 1 incorporating additional elements according to an exemplary embodiment.

FIG. 1 illustrates a hearing device, here a hearing aid, being a behind-the-ear hearing aid with an output transducer configured to be located in the ear canal of a wearer, and a housing configured to be positioned behind/at the pinna of the wearer, a so-called behind-the-ear housing. FIG. 3 provides another illustration of the hearing aid of FIG. 1, in which an example configuration of additional elements is shown. The hearing aid comprises a first wireless interface communicating via a first antenna element (illustrated with an antenna symbol in FIG. 3). The first antenna element may be formed in the behind-the-ear housing, as shown in FIG. 3, or it may alternatively be formed in a member connecting the behind-the-ear housing with the in-the-ear housing, or, the antenna may be formed partly in the behind-the-ear housing and partly in the connecting member and/or the in-the-ear housing. The first wireless interface is configured to operate at a first operational frequency. Here the first wireless interface is configured to operate at 2.4 GHz, but other operational frequencies may be used. The hearing aid further comprises a second wireless interface configured to communicate via a first coil, such coil being illustrated in the example configuration of FIG. 3. This second wireless interface is configured to communicate at a different frequency/frequency band than the first wireless interface. In this instance, the second wireless interface is connected to a coil, which is configured to communicate with another coil inductively, such as in a contralateral hearing aid or the like, or even with an external device located e.g. at the chest of the wearer. The first and second wireless interfaces may be provided as separate components in the hearing aid or may be provided as part of the same integrated component. For the first wireless interface, a matching circuit may be provided to ensure that the wireless interface output is matched to the antenna to maximize performance of the antenna, e.g. in dependence of the environment of the antenna, such as loading by the presence of the head of the wearer.

The hearing aid further comprises a power source (BAT) configured to provide power to components of the hearing aid. The battery is preferably rechargeable but may alternatively be replaceable. The recharging of the battery may be wired or wireless.

The hearing aid is here configured to charge a transmitter part of the first wireless interface according to a charge profile. This transmitter part may be a power amplifier in the wireless interface. The output power may be in the range of −16 dBm to +6.5 dBm, or, expressed as in the range of 0 mA to 10 mA. In between the minimum and the maximum power levels, a number of discrete power levels are defined, here numbered PL0 to PL12, where each power level may be selected based on certain criteria, such as link quality and/or bandwidth requirements for certain communication speeds. For instance, power level 12 may be useful for one type of communication, such as two-way speech communication to a mobile phone, and a lower power level may be sufficient for two or one way communication of control data where the required data transmission speed is lower and thus a lower power level may be sufficient, which in turn help extend battery lifetime/operation time. By dynamically adapting the target power level, the drain on the battery may be minimized.

The charge profile defines a relation between charged power level and time, the charge profile defining a first inclination, or first rate, being in the range of 2.5 mA/microsecond to 4 mA/microsecond. The rate thus expresses the speed of energy flow into the energy storage. For a battery, the charge and discharge rate is the measurement of current in which the battery is charged and discharged at. When a battery is configured to charge a capacitor (e.g., the capacitor labeled "CAP" in the example configuration of FIG. 3), and the battery is connected to a series resistor and capacitor, the initial current is high as the battery transports charge from one plate of the capacitor to the other. The charging current asymptotically approaches zero as the capacitor becomes charged up to the battery voltage. However, in the present disclosure, the capacitor is selected so that the needed charge is not near the battery voltage. This means that the charge rate is near a linear part of the Charing current vs RC time plot.

Each time the transmitter, i.e. a temporary energy storage of the transmitter/wireless interface, is charged for transmission of a data package, power is drained from the battery. This may cause generation of a disturbing magnetic field which then cause interference in the second wireless interface, or more precisely, in the coil connected to the second wireless interface. The interference may be lessened by appropriately placed screens and/or filters, however, when the interference is at the reception/transmission frequencies, it is more efficient to eliminate the disturbance at the source of the disturbing signal or at least ensure that the disturbance occur at time instances/frequencies where they do not collide with communication via the second wireless interface.

By utilizing a relatively fast charge profile, i.e. a short charge period, for charging from the baselevel to the maximum power level, a short period of disturbance is achieved.

The shorter charge period also changes the spectrum of the electromagnetic noise generated by the charge, which help reduce the noise at the operation frequency of the second wireless interface/the coil.

The frequency of transmission of packages may be known, charging may be timed with a view to both the data protocol used via the first wireless interface as well as the data protocol on used via the second wireless interface. As one example, if the second wireless interface transmits data at one rate, which relatively well-known time instances, the charging could be prioritized to be timed to times where there is little to no risk of interference to occur.

As illustrated in FIG. 1, the coil, here designated 'Wireless Interface II', may be positioned far away from the first wireless interface, so that noise generated at the first wireless interface is less likely to disturb the operation of the coil.

Figure 2:
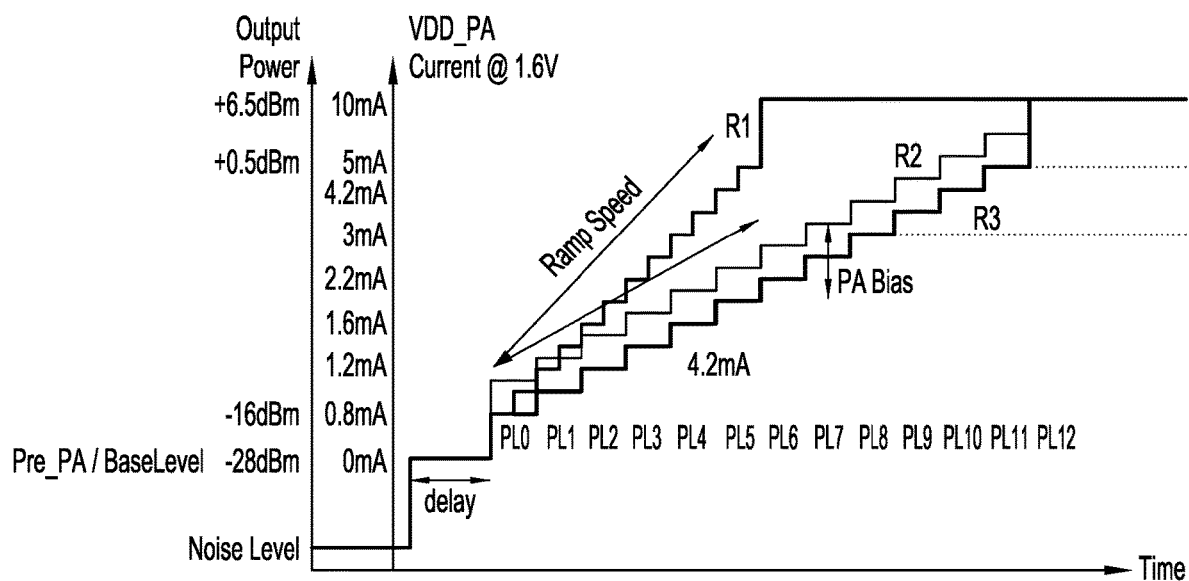
FIG. 2 schematically illustrates a graph.

FIG. 2 schematically illustrates charge levels as function of time. The figure comprises three lines, R1, R2 and R3, each illustrating three different ramp-up speeds, where R3 is the slowest, and R1 is the fastest.

Using R1, a ramp up speed from level PL1 to the highest power level, PL12, is achieved in 2 microsecond, whereas following the slowest, R3, would require 4 microseconds. Using the fastest ramp up speed achieves at least most of the above-mentioned advantages.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

The invention claimed is:

1. A hearing aid comprising:
  a first wireless interface communicating via a first antenna element, the first wireless interface configured to operate at a first operational frequency, the first wireless interface including:
    a transmitter, and
    a capacitor configured as a charge storage from which the transmitter draws current during a transmission event of the hearing aid,
  a power source configured to provide power to components of the hearing aid,
  wherein the hearing aid is configured to charge the capacitor of the first wireless interface to one of a plurality of discrete power levels according to a charge profile, and where the charge profile defines a relation between charged power level and charge time, wherein the charge level is associated with a transmission event type,
  wherein the capacitor is charged to the charged power level prior to a transmission event.

2. The hearing aid according to claim 1, wherein the charge profile defines a charge rate in an interval, and the hearing aid is configured to charge the capacitor to the selected charge level for a shortest charge period.

3. The hearing aid according to claim 1, wherein the charge profile defines a number of different ramp-up speeds for charging the capacitor, and the hearing aid is configured to select the ramp-up speed giving a shortest charge period.

4. The hearing aid according to claim 1, wherein the charge profile defines a charge rate being in the range of 2.5 mA/microsecond to 4 mA/microsecond for one of the power levels.

5. The hearing aid according to claim 4, wherein the second wireless interface is configured to communicate inductively in a frequency range of 1-900 MHz.

6. The hearing aid according to claim 1 further comprising a second wireless interface configured to communicate via a first coil.

7. The hearing aid according to claim 6, wherein the second wireless interface is configured to communicate inductively to an external device, such as a contralaterally placed hearing aid, for transmitting audio signals from the hearing aid to the contralaterally placed hearing aid for supplying binaural sounds to the user.

8. The hearing aid according to claim 7, wherein the hearing aid is configured to receive digitized sound via the first wireless interface and the hearing aid is further configured to transmit the received digitized sound, or a processed version hereof, to the contralaterally placed hearing aid.

9. The hearing aid according to claim 1, wherein the transmitter is configurable to transmit at any one of the plurality of discrete power levels.

10. The hearing aid according to claim 1, wherein the transmission event is transmission of a data package according to a protocol.

11. The hearing aid according to claim 1, wherein a highest discrete power level provides transmission signal strength for two-way audio communication.

12. The hearing aid according claim 1, wherein the first wireless interface is configured to communicate using Bluetooth and/or Bluetooth Low Energy protocol.

13. A system comprising a hearing aid according to claim 1 and a mobile phone, where the hearing aid is configured to communicate with the mobile phone for transmission of speech to and from the mobile phone during a call.

14. A binaural hearing aid system comprising two hearing aids according to claim 1.

15. An earphone comprising a housing configured to be positioned at an ear canal of a user,
the earphone comprising:
a first wireless interface communicating via a first antenna element, the first wireless interface configured to operate at a first operational frequency, the first wireless interface including:
a transmitter, and
a capacitor configured as a charge storage from which the transmitter draws current during a transmission event of the hearing aid,
a power source configured to provide power to components of the hearing aid,
wherein the hearing aid is configured to charge the capacitor of the first wireless interface to one of a plurality of discrete power levels according to a charge profile, and where the charge profile defines a relation between charged power level and charge time, wherein the charge level is associated with a transmission event type,
wherein the capacitor is charged to the charged power level prior to a transmission event.

* * * * *